United States Patent [19]

Feucht et al.

[11] 4,076,194
[45] Feb. 28, 1978

[54] SNUBBED PAD RESILIENT MOUNT

[75] Inventors: Dennis D. Feucht, Morton; Terry W. Ryan, Peoria, both of Ill.

[73] Assignee: Caterpillar Tractor Co., Peoria, Ill.

[21] Appl. No.: 730,543

[22] Filed: Oct. 7, 1976

[51] Int. Cl.² .............................................. B62D 27/04
[52] U.S. Cl. ................................................ 248/9; 248/22
[58] Field of Search ................................. 248/9, 22, 20

[56] References Cited

U.S. PATENT DOCUMENTS

| | | | |
|---|---|---|---|
| 2,147,660 | 2/1939 | Loewus | 248/22 |
| 2,430,709 | 11/1947 | Devorss | 248/22 |
| 2,514,811 | 7/1950 | Stephenson | 248/9 |
| 2,538,658 | 1/1951 | Saurer | 248/22 |
| 2,890,846 | 6/1959 | Schloss | 248/22 |
| 3,060,538 | 10/1962 | Simi | 248/22 X |
| 3,181,850 | 5/1965 | Bajer | 248/22 X |
| 3,448,949 | 6/1969 | Kelley | 248/9 |
| 3,548,964 | 12/1970 | Krauss | 248/9 X |
| 3,622,194 | 11/1971 | Bryk | 248/9 |

Primary Examiner—Francis K. Zugel
Attorney, Agent, or Firm—Wegner, Stellman, McCord, Wiles & Wood

[57] ABSTRACT

A resilient mount for attaching a relatively heavy engine to a frame includes a housing secured to the frame defining an internal chamber, a resilient pad disposed between the housing and the engine and upon which the engine rests, and a snubber spool fixed to the engine extending through an opening in the housing and having an enlarged flange enclosed with resilient material within the chamber, so that normal vibration of the engine is absorbed by the pad and excess vibration is controlled by the material on the flange contacting the chamber walls.

4 Claims, 3 Drawing Figures

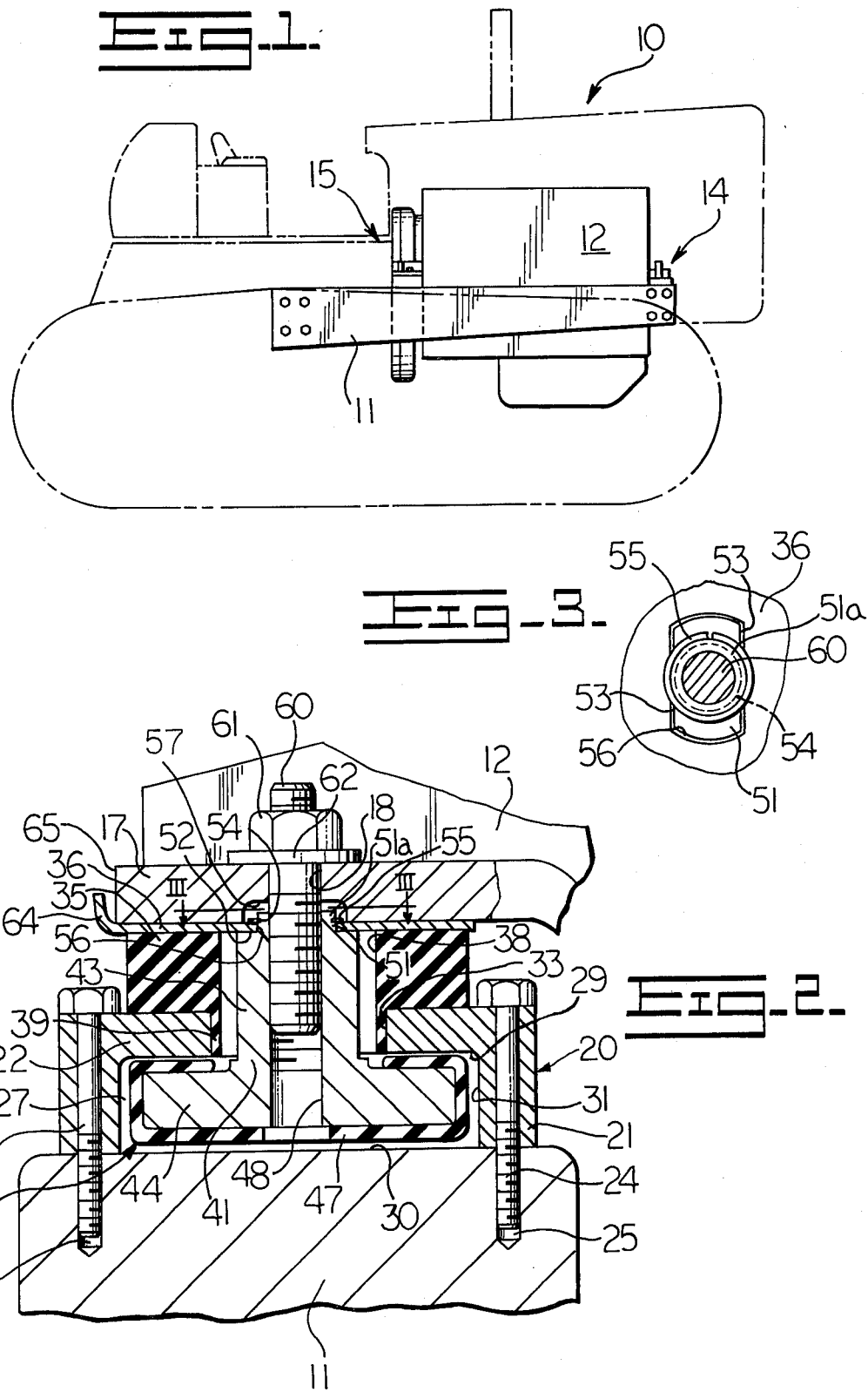

SNUBBED PAD RESILIENT MOUNT

BACKGROUND OF THE INVENTION

1. Field of the Invention

This invention relates generally to an engine mounting and, more particularly, to a rugged resilient mount for attaching a relatively heavy engine to a frame to prevent metal-to-metal contact between the engine and the frame.

2. Description of the Prior Art

In mounting an engine to the frame of a vehicle, a pathway of metal-to-metal contact can generally be followed from engine to frame. Considerable undesired noise is generated from such an arrangement especially where high dynamic forces create large amounts of vibration. It is highly desirable to provide means for mounting the engine to the frame which eliminates metal-to-metal contact and effectively absorbs vibrational energy.

Resilient engine mounts are known in the prior art for absorbing vibrational forces to deter the transmission of such forces between the engine and the frame. Illustrative of prior art patents are Crews U.S. Pat. No. 3,663,856, Kirchgessner et al U.S. Pat. No. 3,770,231, Herman et al U.S. Pat. No. 3,883,099 and Hermann et al U.S. Pat. No. 3,883,100, all of which are assigned to the assignee of the present invention.

SUMMARY OF THE INVENTION

It is the principal object of the invention to provide an improved, relatively simple snubbed pad resilient engine mount in which a low spring rate resilient mount for attaching an engine to a vehicle frame controls dynamic forces in all directions through the use of a snubber.

In accordance with the invention, the engine mount includes a snubber housing secured to the frame and defining an internal chamber, a resilient pad disposed between the housing and the engine upon which the engine rests, and a snubber spool fixed to the engine extending through an opening in the housing and having an enlarged flange surrounded by a resilient element positioned within the chamber. The mount permits limited movement of the engine relative to the frame, but avoids substantial engine displacement so as to prevent undue stresses upon the drive train components. By employing a resilient pad and a cushioned snubber, the engine and frame are effectively isolated so that there is never metal-to-metal contact thereby lessening noise production.

The snubbed pad mount provides a low spring rate through the use of a single soft rubber pad and provides control of large forces in all directions through the use of the snubber. Thus, it is possible to have the benefit of better isolation (due to low spring rate) while controlling engine motion to relatively low amplitude. The pad and snubber housing in conjunction with the snubber provide maximum control (minimum stack-up) of tolerance on snubber-to-housing clearance.

A retaining ring is utilized to hold the snubber, the pad, a plate and the snubber housing together. In this manner, the engine mount unit can be preassembled so that the engine can be expeditiously mounted on the frame with no loose parts requiring assembly during engine installation.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a side elevational view of a track-type tractor, shown in phantom lines, employing engine mounts constructed according to the invention;

FIG. 2 is an enlarged partial cross-sectional view of an engine mount employed in FIG. 1; and, FIG. 3 is a reduced scale cross-sectional view taken along the line 3—3 in FIG. 2.

DESCRIPTION OF THE PREFERRED EMBODIMENT

Referring to FIG. 1, a vehicle, such as track-type crawler tractor 10, comprises a frame 11 having an engine 12 mounted thereon by three engine mounts disposed in triangular relationship with respect to each other when viewed in top plan. A first engine mount 14 is provided at the front, longitudinal center of the engine 12. Second and third identical engine mounts, one of which is shown and designated 15, are provided at the rear of the engine 12 on opposite, transverse sides thereof.

As shown in FIG. 2, the engine 12 has an engine attaching means, such as an outwardly projecting horizontal mounting bracket or flange 17, having an opening 18 extending therethrough.

Since the engine mounts 14 and 15 are similar, for purposes of clarity and brevity, only engine mount 14, as shown in FIG. 2, will be described in detail. The engine mount 14 has a snubber housing 20 with a lower annular side wall portion 21 and an upper annular cap portion 22. The snubber housing 20 is removably secured to a generally horizontal segment of the frame 11 by bolts 24 which extend through the cap portion 22 and the side wall portion 21 and are screwed into threaded bores 25 formed in the frame 11. The snubber housing 20 and the frame 11 thereby define a generally cylindrical chamber 27 with a top surface 29, a bottom surface 30 and an annular side surface 31. The cap portion 22 has an opening 33 formed therethrough to permit entry into the interior of the chamber. It is understood that the cap portion 22 and side wall portion 21 may be formed by two separate pieces if desired.

Disposed between the flange 17 of the engine 12 and the snubber housing 20 are a resilient soft rubber pad 35 and a plate 36. The engine 12 lies vertically above the pad 35 and is supported thereby. The pad 35 has an axially extending bore 38 and an annular protrusion 39 with an outside diameter such that the protrusion 39 fits snugly within and lines the opening 33 in the snubber housing 20. When the engine load is placed on the engine mounting 14, the pad 35 has a suitable compression coefficient to resiliently mount the engine 12 without destructive deformation. Typically, the pad 35 is reduced in thickness when the engine load is placed thereon.

A snubber assembly 40 is seen to include a spool 41 having a stem 43 and a flange 44 extending radially outward from the stem 43 at one end thereof, a resilient sheath or rubber element 47 formed around the flange 44, and a bore 48 extending axially through the spool 41. The flange 44 is positioned within the snubber housing 20 with the stem 43 extending upwardly through the opening 33 and the axial bore 38 in the pad 35.

The spool stem 43 is of a size sufficient for passing through and being spaced from the walls of the opening 33 of the snubber housing 20 as defined by the bore 38 of the pad 35. The spool 41 is of sufficient length to permit proper positioning of the flange 44 within the snubber housing 20 when the engine load compresses the pad 35.

At the upper end of the spool stem 43 is a relatively narrow protrusion 51 defining a shoulder 52 on which the plate 36 seats. The protrusion 51, as can be seen in FIG. 3, is a segmented portion of a cylinder having elongate parallel sides 53 and an upstanding circular lug 51a centrally disposed therein. A slot 54 is formed at the base of the lug 51a in which a retaining ring 55 is seated to retain the plate 36 on the shoulder 52 of the spool stem 43. The plate 36 has an opening 56 corresponding in size and shape to the protrusion 51 on the stem 43. The plate 36 and the flange 44 of spool 41 maintain the pad 35 and the cap portion 22 of snubber housing 20 captured therebetween so as to form a preassembled unit.

The engine flange 17 has a counterbore 57 in the undersurface permitting insertion of the protrusion 51 and the retaining ring 55 therein so that the plate 36 is permitted to seat flat on the undersurface of the engine flange 17.

A stud or shaft 60 is threaded into the threaded bore 48 in the stem 43 and extends axially beyond the protrusion 51 on said spool 41. The extended end portion of said shaft 60 projects through the opening 18 in the engine flange 17 and has a nut 61 and a washer 62 connected to the outer end thereof for connecting the engine flange 17 to the snubber assembly 40. The plate 36 has a tang 64 which will react against the edge 65 of the engine flange 17 to compensate for torque applied to tighten the nut 61 and prevent twisting of the pad 35 during assembly.

The snubber flange 44 is positioned so that its resilient sheath or rubber element 47 is spaced from the internal surfaces 29, 30 and 31 of the chamber 27 thereby permitting limited movement of the engine 12 relative to the frame 11. The thickness of the pad 35 can be suitably selected to provide for this spacing. The engine mounts, such as 14, can be preassembled into individual units prior to mounting them to the frame 11 or the engine 12, so that assembly time for the vehicle itself is reduced. The mount is assembled so that the snubber housing 20 and the pad 35 are held together on the snubber spool 41 between the plate 36 and the snubber flange 44 by means of the retaining ring 55. The shaft 60 is already threaded into the snubber spool 41. As a result, when the tractor 10 is being assembled, one need only take a preassembled mounting unit, bolt the snubber housing 20 to the frame 11 by passing bolts 24 through the wall portion 21 of the snubber housing 20, place the engine 12 on the mounting unit with the shaft 60 aligned in the flange opening 18, and tighten down the nut 61.

Installed on the vehicle and in operation, the pad 35 carries the engine load. The pad 35 provides a rugged noise suppressing mounting since there is no metal-to-metal contact between the engine 12 and the frame 11. The engine 12 can move and impact the connection, the normal vibrational forces being carried and absorbed by the pad 35 owing to the absence of a metal-to-metal pathway between the engine 12 and the frame 11. When relative movement between the engine 12 and the frame 11 is too great, the resilient sheath or rubber element 47 of the snubber assembly 40 contacts the internal walls of the chamber 27 to restrict excess relative movement between the engine 12 and the frame 11. The resilient sheath or rubber element 47 prevents metal-to-metal contact between the snubber assembly 40 and the snubber housing 20 thereby reducing noise. It can be seen that the snubber assembly 40 does not contact the interior walls of the isolation chamber 27 or the top of the frame 11 except when a load is applied which exceeds the resistance of the pad 35.

As will be apparent, engine mounts constructed according to the invention may have the snubber housing attached to the engine or to the frame with the snubber and other associated parts being attached to the other of the engine or the frame.

What is claimed is:

1. An apparatus for resiliently mounting an engine on a frame comprising:
   a housing adapted to be secured to the frame, said housing defining an internal chamber and an opening to said chamber having a diameter less than said chamber;
   means for securing said housing to the frame;
   a resilient pad disposed between said housing and the engine and having a protrusion extending into said opening in said housing, said pad and said protrusion having a common axially extending bore extending therethrough into said housing, the engine being seated on said pad;
   a snubber spool adapted to be secured to the engine, said snubber spool having a stem portion extending through said bore and being radially spaced out of contact with the walls of said bore, said spool having an enlarged flange portion extending radially from said stem portion and being positioned within said chamber with a diameter of said flange portion being greater than the diameter of said bore and being less than the diameter of said chamber;
   a resilient element separate from said resilient pad and being disposed about said flange in spaced relation to the walls of said chamber and to the frame; and
   means for securing said snubber spool to the engine.

2. The apparatus of claim 1 wherein said means for securing said snubber spool to said engine includes a threaded shaft extending from said stem portion, a mounting portion on the engine having an opening therethrough, said shaft extending through said opening in said mounting portion, and a nut mating with said shaft and adapted to seat on said mounting portion to secure said snubber spool to the engine.

3. The apparatus of claim 2 further including a plate member disposed between said pad and the engine, said plate member having a tang for engaging the engine to prevent rotation of said plate member and, in turn, twisting of said pad when said nut is tightened.

4. The apparatus of claim 3 further including a retaining ring, said ring being connected to said snubber spool outboard of said plate member for retaining said plate member on said snubber spool thereby maintaining said snubber housing and said pad between said snubber flange and said plate member.

* * * * *